United States Patent Office 3,394,174
Patented July 23, 1968

3,394,174
AMPHOTERIC PHENOLIC COMPOUNDS CONTAINING AMINE GROUPS AND SULFONIC ACID OR CARBOXYLIC ACID GROUPS
Robert Feigin, West Orange, N.J., assignor to The Tanatex Chemical Corporation, Lyndhurst, N.J., a corporation of New Jersey
No Drawing. Continuation of application Ser. No. 475,623, June 9, 1965, which is a continuation of application Ser. No. 88,249, Feb. 10, 1961. This application May 2, 1967, Ser. No. 635,623
4 Claims. (Cl. 260—509)

ABSTRACT OF THE DISCLOSURE

Compounds having the formula:

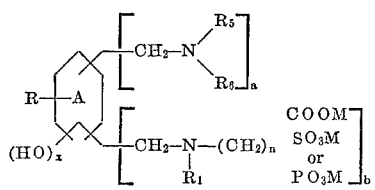

wherein A is phenyl or naphthyl, R is hydrogen or alkyl of up to 12 carbon atoms, M is hydrogen, alkali metals, ammonium, amine groups or lower alkyl ester groups, $R_5$ and $R_6$ are each hydrogen, lower alkyl, cycloalkyl of up to 8 carbon atoms or together a cycloaliphatic amino, $a$, $b$, $x$ and $y$ are integers of 1–2 and $n$ is an integer of 1–6, which compounds are useful as surface active agents, sequestering agents, germicides, dispersants, solubilizers, emulsifiers and coupling agents.

This application is a continuation of my application Ser. No. 475,623, June 9, 1965, now abandoned, which in turn was a continuation of my original application Ser. No. 88,249, Feb. 10, 1961, now abandoned.

This invention relates to amphoteric non-resinous phenolic compounds obtained by the condensation of phenols, having at least one free nuclear position ortho or para to the phenolic hydroxyl group, with formaldehyde and secondary non-aromatic amino sulfonic acids, such as non-aromatic N-substituted taurine or taurate salts. It also relates to phenolic compounds having at least two free nuclear positions ortho and para, or both ortho, to the phenolic hydroxyl group, reacted with formaldehyde, a secondary amino acid, or a salt thereof, and a low molecular weight primary or secondary non-aromatic amine.

These products are useful as neutral, acid and alkaline surface active agents, as sequestering agents, as germicides in neutral, alkaline and acid aqueous media, as dispersants, solubilizers, coupling agents, emulsifiers and for applications associated with surface active agents. They are also useful as chemical intermediates such as in the preparation of dyestuffs and fungicides. The method of preparation is essentially like that often referred to as the Mannich reaction. Contrary to statements in the literature that secondary amines which contain acid forming groups such as carboxyl or sulfonic groups are inoperative to condense with formaldehyde and a phenol, it has been found that such secondary amines do react readily.

Unlike the Mannich phenolic bases which are cationic and whose water solubility is limited to the lower members of the series, or in acidic solutions, the products of the present invention are amphoteric, both anionic and cationic. They are either soluble or dispersible in water in neutral and alkaline solutions as well as in acid, even though the molecular weights of the products are of the order of several hundred.

Primary alpha amino acids or their salts together with formaldehyde fail to condense with alkyl phonols such as nonylphenol. On the other hand, 6-aminohexanoic acid, obtained from the hydrolysis of caprolactam, reacts successfully. Secondary amino acids such as N-methyl or N-cyclohexyl taurine, sarcosine, N-isopropyl aspartate in the form of their alkali metal or tertiary amine salts react very readily.

With secondary amino acids there is a certain degree of specificity. Hydroxyethyl glycine and iminodiacetic acid salts condense with formaldehyde and phenol, but not with higher alkyl phenols. Sodium glycinate and formaldehyde condense with phenol to form

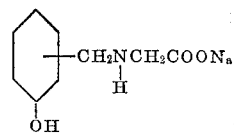

which is a secondary amino acid salt. This in turn will react with formaldehyde and condense with an alkyl phenol such as nonylphenol.

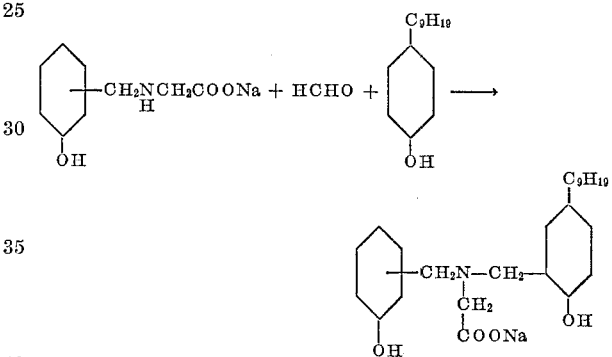

Similarly, if an alkyl phenol having two nuclear positions available in the ortho or para positions with respect to the phenolic hydroxyl group, is first reacted with formaldehyde and a secondary amino acid salt, so that the product is water soluble or dispersible, it can then be made to condense with primary amino acids or their salts and formaldehyde.

Accordingly it is an object of this invention to provide a series of amphoteric compounds based on the reaction product of an alkyl phenol and a secondary non-aromatic amino acid compound.

Other objects and advantages of the invention will in part be obvious and in part appear hereinafter.

The products of this invention may be represented by the following schematic structures:

In this sequence of schematic structures, for purposes of clarity, I have shown them as ten types which actually may be classified as two fundamental types. That is, the compounds labelled parenthetically I and II represent the two fundamental formulas which differ from each other: first in being amino sulfonic acid derivatives, wherein the aromatic nucleus carries 1, 2, or 3 such groups, with or without a substituted amine also on the nucleus. The first three types correspond to this definition; the remaining ones are carboxy methyl secondary amino acid compounds, substituted on the aromatic nucleus once or twice.

(1)

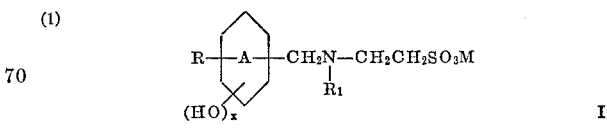

I

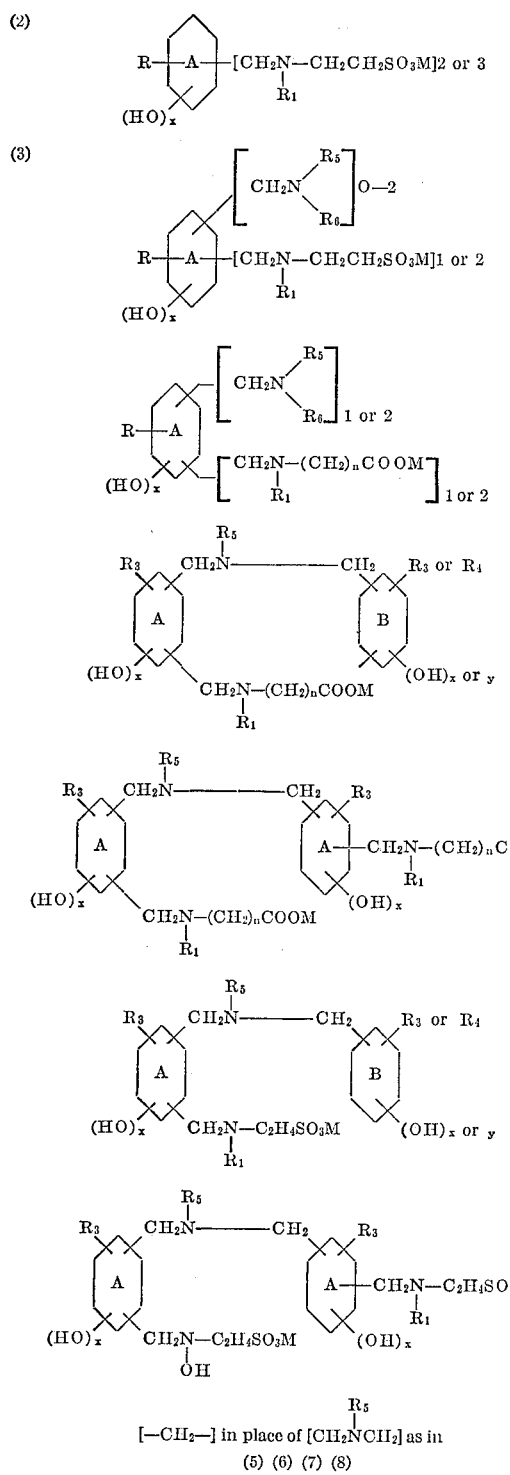

```
[—CH₂—] in place of [CH₂NCH₂] as in      (9)  I
          (5) (6) (7) (8)

[—S—] in place of [—CH₂—] as in (9)      (10)
```

A, B are mono- or polycyclic aromatic hydrocarbon moieties e.g., phenyl, phenyl phenol, naphthol, phenyl naphthol, diazonium compounds—any aromatic structure which will carry an OH group;

R, $R_3$ or $R_4$ is any nuclear substituent such as H, alkyl, aryl or polycyclic, halogen, nitro, amino, diazonium, etc.;

$x$ and $y$ are integers less than 6;

$R_5$ and $R_6$ are non aromatic moieties and divalent aliphatic groups which with the nitrogen atom may form a heterocyclic ring; or $R_5$ or $R_6$ may be H in types (3) and (4), but not in types 5, 6, 7, 8;

M is tertiary amine, H or salt forming metal, alkali metal, such as sodium, potassium, or other alkali metal or amide forming group, or other group making the compound an ester;

$R_1$ is any low molecular weight non aromatic hydrocarbon structure, preferably containing less than about 10 carbon atoms;

$n$ is an integer, preferably less than about 10.

In the foregoing group of representations, it is to be understood that the $SO_3$ group and the COO— group may be replaced by $PO_3$ to give a corresponding sequence of phosphonic acid compounds.

When it is desired to condense an alkyl phenol or substituted phenol with formaldehyde and a secondary amino acid or salt, the phenol is often immiscible with the other reactants. Unless a coupling agent, or hydrotropic agent or water-miscible solvent is added, the phenol may not react. The addition or incorporation of an alcohol, glycol, fatty acid, aromatic acid, sodium xylene sulfonate, soap, wetting agent or emulsifier will make the reaction proceed readily.

In the case of sodium N-methyl taurate, aqueous or solid form of formaldehyde, and a mono alkyl phenol the resulting products have a structure represented by the following:

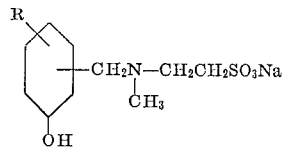

When R is greater than $C_3H_7$, the products have well developed wetting, foaming and other surface active properties and are water soluble detergents as well as amphoteric germicides.

The preceding product will condense further with formaldehyde and an amino compound, such as an alkyl taurine, a primary or secondary amine or a primary amino or secondary amino acid to give the structure outlined for compounds of this invention. Many of these products have excellent germicidal or specific germicidal activity, with water solubility and detergent characteristics.

If the same product is reacted with formaldehyde alone, I obtain products of structure (9). With sulfur chloride I obtain products of structure (10). Both of these structures have germicidal as well as detergent properties.

The methods of manufacture, isolation and purification of the products of this invention are detailed in the following examples, and references. The factor of miscibility of the reactants has already been mentioned. The examples, cited for illustration, should not be construed as limiting the scope of the invention. It will be apparent that variations in technique, weights and molecular proportions, temperatures, reaction times, sequence of mixing, dilutions, pH adjustments and other variables can be made to obtain the products of this invention in different yields, concentrations and degrees of purity.

The products of this invention may be isolated and purified by conventional techniques, such as salting out, evaporation to dryness, extraction with solvents, precipitation by reagents or addition of water miscible solvents, such as acetone, removal of unreacted raw materials, etc. The products may be prepared as mixtures or may be made with various formulation additives incorporated in situ.

The reactions are applicable to polycyclic, polyhydric, and substituted phenols. Ordinarily when a phenol is treated with formaldehyde, resinification occurs. However, in the presence of a primary or secondary amino compound, formaldehyde reacts with the former more readily than with the phenol. Hence, the amino compound may be mixed together with the phenol, and the formaldehyde added last without appreciable resin formation, especially if the temperature is maintained low; either by external cooling, dilution or slow addition of the reactants. Or the formaldehyde may be reacted with the amino compound first and the phenol incorporated last.

With resorcinol which is many times more reactive than monohydric phenols, less reactive aldehydes than formaldehydes may be employed to obtain useful derivatives. Sodium N-methyl taurate and resorcinal with aliphatic aldehydes up to $C_5$, salicylaldehyde and benzaldehyde are found to react. With beta-N-butyl amino propionic acid, aliphatic aldehydes up to $C_6$ are found to react. These compounds are germicidal and particularly effective against M. pyogenes var. aureus. For example the reaction product of resorcinol, valeraldehyde and sodium N-methyl taurate

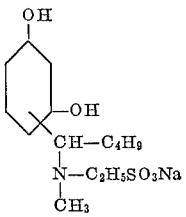

exhibits a phenol coefficient of 32. It has good water solubility and surface active properties. Starting with an alkyl resorcinol, the reaction product with valeraldehyde and sodium N-methyl taurate would have the same structure but with an alkyl radical in the ring. Sodium sulfobutyraldehyde, obtained by the reaction of sodium bisulfite and crotonaldehyde, reacts with dimethyl amine and resorcinol.

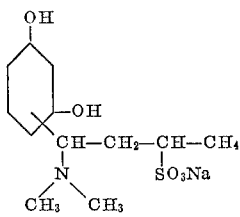

Higher molecular weight amines react, but less readily and in poorer yields. Alkylated resorcinols also react to give the analogous alkyl derivatives.

Another type of amphoteric phenolic which can be synthesized by indirect means is the following:

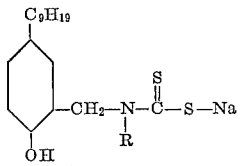

The alkylphenol is first reacted with a primary amine and formaldehyde, then carbon disulfide and caustic are added to form the compound. Compounds of this type have fungistatic activity.

The products of this invention can be used as intermediates for further reactions with formaldehyde and mercaptans:

EXAMPLE A

The sequential reaction of 1 mole each of sodium N-methyl taurate, formaldehyde, phenol, formaldehyde and dodecylmercaptan readily yields:

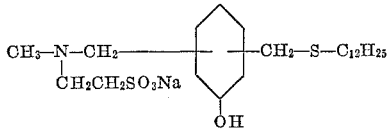

EXAMPLE B

The sequential reaction of 1 mole each of sodium N-methyl taurate, formaldehyde, phenol, formaldehyde, monomethyl amine, formaldehyde and dodecylmercaptan produces:

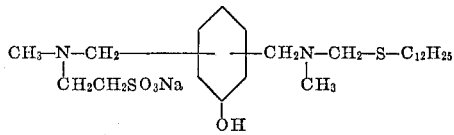

This product and others where the $-C_{12}H_{25}$ group is replaced by other alkyl, aryl, or heterocyclic moieties, (Y) i.e. as follows:

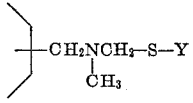

are useful germicides and fungicides and are effective for dandruff treatment.

EXAMPLE C

Using as one starting material, the reaction product of caprolactam, formaldehyde and an alkyl mercaptan (Benson and Cairns; J. Am. Chem. Soc. 70, 2115 (1948))

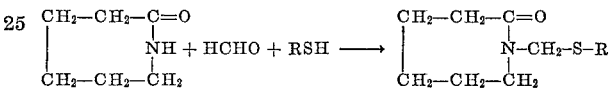

followed by hydrolysis of the caprolactam ring with alkali I obtain

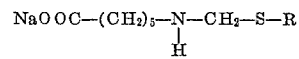

Employing as another reactant a typical product of this invention and formaldehyde I obtain such products as

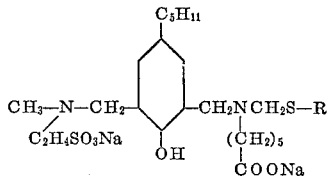

Some of these materials exhibit fungistatic activity against pestis ovale.

The following examples are typical of the methods, reaction products and applicaions of the products. They are in no way intended to limit the scope of this invention which will become apparent to those skilled in the art.

EXAMPLE 1

95 grams of a 23.5% solution of sodium N-cyclohexyl taurate solution, 8.5 grams of 37% formaldehyde solution, 50 milliliters of isopropanol and 22 grams of technical p-nonylphenol were mixed and heated to 70° C. to obtain a clear homogeneous product. It was refluxed for 1 hour. The product was found readily dilutable with water to give good wetting and cleaning properties. It has the following structure:

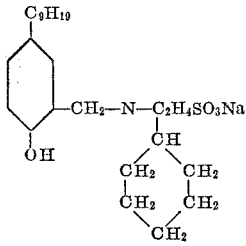

EXAMPLE 2

50 grams of a 65% solution of sodium N-methyl taurate, 39 grams water, 17 grams of 37% formaldehyde solution were mixed and cooled to 30° C. 44 grams of technical p-nonylphenol were added, followed my 35 milliliters of isopropanol. After mixing for 5 minutes the mixture became clear and homogeneous. It was heated to 80° C. The reaction product was precipitated out by dilution of the solution with acetone, filtered and dried. It was found to give clear solutions in water, alkali and acid solutions, foaming in hot water. It has excellent detergent action. It was found to sequester copper and ferric ions in alkaline solutions. The structure of the compound formed is:

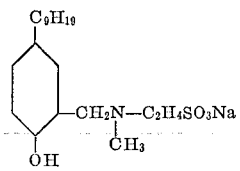

EXAMPLE 3

220 grams (1 mole) of nonylphenol were added to a mixture of 248 grams (1 mole) of 65% solutions of sodium N-methyl taurate, 81 grams (1 mole) of 37% formaldehyde solution and 100 grams isopropanol. The temperature rose to 51° C. in about 10 minutes and after standing overnight, the product identical to that of Example 2 was used in the preparations following in Examples 4 and 5.

EXAMPLE 4

0.5 mole of sulfanilic acid was diazotized according to the procedure given in "Organic Syntheses," collective volume 2, page 35. Half of the product of Example 3, equal to 0.5 mole was mixed with 50 grams of caustic soda, 150 grams water, 100 grams ice. The diazonium compound was then added to the phenolic to couple and a very soluble red dyestuff formed. In acid solution the dye changes to yellow. The structure of the product may be represented as:

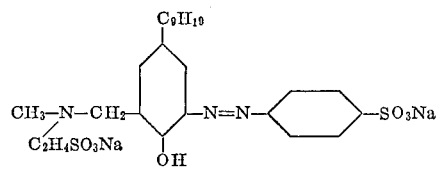

EXAMPLE 5

0.5 mole benzene diazonium chloride was prepared by diazotizing 0.5 mole aniline with sodium nitrite and hydrochloric acid at 0° to 5° C. Half of the product of Example 3 was mixed with ice, water and caustic soda as in Example 4 and the two solutions mixed to form a red dye which was concentrated into a paste containing about 60% solids. The structure of product obtained is:

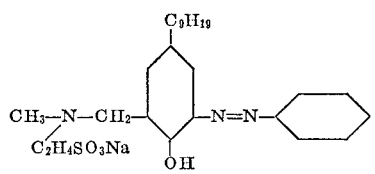

EXAMPLE 6

370 grams of a 30% sodium sarcosinate solution (1 mole), 38 grams water, 162 grams of 37% formaldehyde solution (2 mole), 100 grams isopropanol and 220 grams nonylphenol (1 mole) were mixed and after 15 minutes the temperature rose to 45° C. and a clear homogeneous product resulted. After mixing for a total of 25 minutes, 110 grams of 40% dimethyl amine solution (1 mole) were added and the mixture refluxed for 1 hour. The resulting product containing 40% solids was diluted with water and tetra sodium ethylene diamine tetraacetate incorporated to obtain a detergent composition containing 25% surfactant and 3.0% of the sequestering agent, the pH being adjusted with dilute sulfuric acid to about 9. This composition showed a phenol coefficient at 20° C. against *Salmonella typhosa* of 12.5 using the A.O.A.C. method. The structure of the active ingredient may be represented as follows:

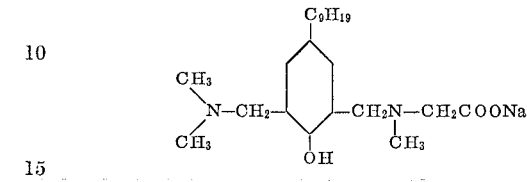

EXAMPLE 7

75 grams of 65% sodium N-methyl taurate solution (0.3 mole), 24 grams of 37% formaldehyde solution (0.3 mole), 51.3 grams water and 43.5 grams of 8-hydroxyquinoline (0.3 mole) were mixed together and heated to 72° C. at which point a clear solution formed. Then 190.8 grams water were added to obtain a solution containing 25% solids. The product has the structure

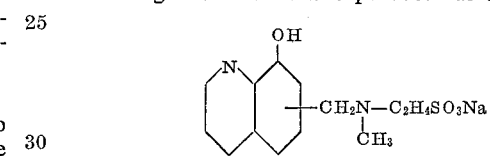

It forms very soluble and highly stable chelates in water with di- and tri-valent metals, unlike the parent compound 8-hydroxyquinoline whose chelates are very insoluble in aqueous systems.

EXAMPLE 8

992 grams of 65% sodium N-methyl taurate solution (4 moles), 648 grams of 37% formaldehyde solution (8 moles) and 400 grams isopropanol were mixed. Then 880 grams (4 moles) p-nonylphenol were added to the solution. The temperature was 43° C. and the product cleared within 2 minutes. After mixing an additional 10 minutes, 65 grams of 92.5% ethylene diamine (1 mole) and 407 grams water added together. The temperature rose to 58° C. The solution was then refluxed for an hour to obtain the product having the following formula:

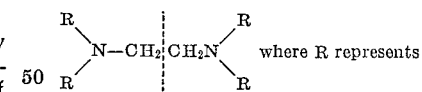 where R represents

The composition is an excellent foaming detergent and forms a very stable chelate with copper ions.

EXAMPLE 9

248 grams of 65% sodium N-methyl taurate solution (1 mole), 81 grams of 37% formaldehyde solution (1 mole) and 114 milliliters water were mixed and cooled to 23° C. To this solution, 99 grams of 92% liquified phenol (0.98 mole) were added dropwise over a period of 20 minutes during which the temperature rose to 33° C. Agitation was continued for an additional hour.

220 grams of 40% dimethylamine solution (2 moles) were then added to the product and the solution cooled to 24° C. 161 grams of 37% formaldehyde solution (2 moles) were added and the temperature rose to 40° C. The solution was then heated and refluxed for 1 hour during which it became turbid but cleared again on cooling to room temperature. The product has the following schematic structure:

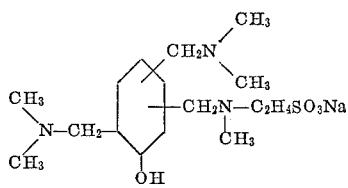

where the substitutions are in the ortho and para positions.

EXAMPLE 10

248 grams of 65% sodium N-methyl taurate solution (1 mole), 195 milliliters water, 162 grams of 37% formaldehyde solution (2 moles), 150 grams isopropanol and 260 grams of technical p-dodecylphenol were mixed and heated to 60° C. After about 15 minutes the reaction mixture which had cleared was tested and found dispersible in water. Then 105 grams of diethanolamine were added and the preparation refluxed for 1 hour. This product containing 50% solids was found to give foamy solutions in water.

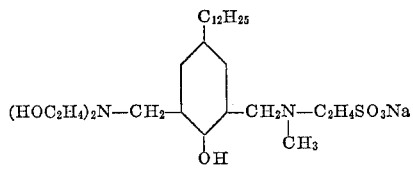

The Draves Wetting Test, using a 1 gram hook and 9 inch strip of Synthron tape, at 23° C. gave wetting out times of 90 seconds, 25 seconds and 18 seconds respectively for concentrations of 0.1%, 0.2% and 0.5% of above product. Similar results were obtained in 5% caustic, 5% acetic acid and 0.1% calcium chloride solutions.

EXAMPLE 11

248 grams of 65% sodium N-methyl taurate solution (1 mole), 149 milliliters water, 162 grams of 37% formaldehyde solution (2 moles), 220 grams of p-nonylphenol were mixed and cleared after 10 minutes at 45° C. After mixing an additional 15, minutes, 59 grams of isopropylamine were added and the solution refluxed for 1 hour. The resulting product, containing 50% solids was diluted with water and compounded with the tetrasodium salt of ethylene diamine tetraacetic acid to give a detergent and germicidal composition containing 25% phenolic surfactant, 3% of the sequesterant with the pH adjusted to about 9 with dilute sulfuric acid. This composition showed a phenol coefficient at 20° C. against *Salmonella typhosa* of 31 using the A.O.A.C. method. The structure of the active ingredient may be represented as follows:

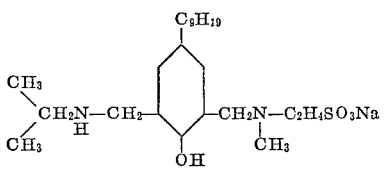

EXAMPLE 12

248 grams of 65% sodium N-methyl taurate solution (1 mole), 78 milliliters water, 162 grams of 37% formaldehyde solution, 80 grams isopropanol were mixed with 208 grams of technical p-octylphenol (1 mole at 45° C. for 30 minutes until the phenol completely dissolved and reacted. Then 110 grams of 40% dimethylamine solution were added. The temperature rose to 55° C. and the solution refluxed for 1 hour. The resulting product was diluted and compounded like that of the Example 11.

The phenol coefficient in this case was 12.5 equivalent to 50 on a 100% solids basis. The structure of the product is:

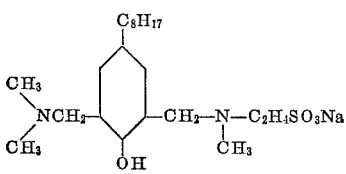

EXAMPLE 13

248 grams of 65% solution of sodium N-methyl taurate (1 mole) 100 milliliters isopropanol, 162 grams of 37% formaldehyde solution (2 moles) were mixed and 220 grams of p-nonylphenol added and the reaction proceeded readily. To this product were added 310 grams of a solution containing 1 mole (155 grams) of the potassium salt of beta amino N-isopropyl propionate. The solution was then refluxed for 1 hour to obtain the following product which is doubly amphoteric:

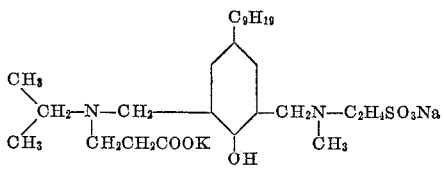

EXAMPLE 14

220 grams of p-nonylphenol (1 mole), 105 grams of diethanolamine and 100 grams isopropanol were mixed and cooled to 25° C. Then 162 grams of 37% formaldehyde solution (2 moles) were added allowing the temperature to rise to 45° C. After mixing for a half hour, 248 grams of 65% sodium N-methyl taurate solution (1 mole) were added. The temperature rose to 55° C. and the product was then refluxed for 1 hour. The resulting product is an excellent wetting agent and detergent.

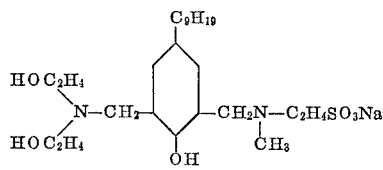

When 370 grams of 30% sodium sarcosinate solution (1 mole) are used in place of the taurate, a similar product is obtained.

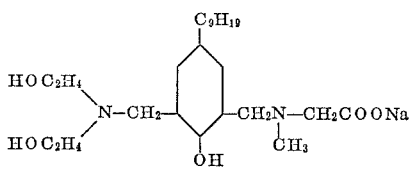

EXAMPLE 15

21.8 grams p-aminophenol (0.2 mole) and 21.2 grams benzaldehyde (0.2 mole) were mixed in 100 grams of ethylene-glycolmonobutyl ether forming the Shiff base upon heating to 100° C. 50 grams of 65% sodium N-methyl taurate (0.2 mole) and 16 grams of 37% formaldehyde solution (0.2 mole) were mixed together and then added to the aldimine solution. After several minutes the solution became clear and homogeneous and readily dilutable with water. The compound formed is the following:

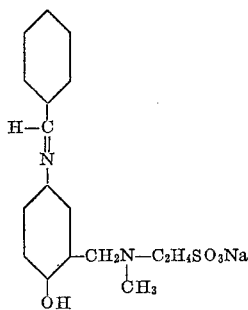

Similarly other reactive ketones, aldehydes or quinones may be used in place of benzaldehyde.

EXAMPLE 16

496 grams of 65% sodium N-methyl taurate solution (2 moles) were mixed with 162 grams of 37% formaldehyde (2 moles) and cooled to room temperature. Then 102 grams of 92% liquified phenol (1 mole) were added dropwise to obtain the following diamphoteric product:

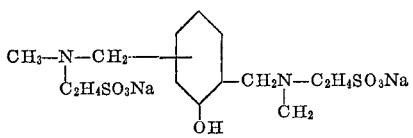

EXAMPLE 17

258 grams of t-octylamine (2 moles) disolved in 30 milliliters of isopropanol were mixed with 162 grams of 37% formaldehyde (2 moles) and added to the product of Example 16. The reactants were agitated and refluxed for 2 hours. After cooling the upper layer containing unreacted t-octylamine and formaldehyde was separated. The bottom aqueous layer when diluted with water containing the principal product was found to have foaming and wetting properties, but the foam disappeared upon acidification.

The chief reaction product has the following structure:

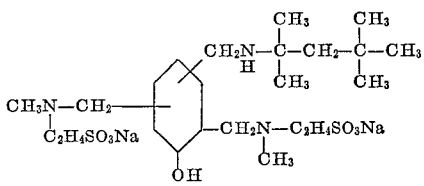

EXAMPLE 18

744 grams of a 65% technical slurry of sodium N-methyl taurate (3 moles) were mixed with 210 grams water and 486 grams of 37% formaldehyde solution (6 moles), then 660 grams of p-nonylphenol added, followed by 300 grams isopropanol. After mixing 5 minutes, the reaction mixture cleared with the temperature reaching 43° C. The solution was mixed an additional half hour during which the temperature reached 48° C. 660 grams of 40% dimethylamine solution (6 moles), representing an excess of 100% of the theoretical, were added and the solution heated under reflux for 1 hour.

The apparatus was then set up for distillation of unreacted dimethylamine and recovery of isopropanol. A total of 810 grams was distilled off. 480 grams of water were then added to the product to obtain 50% solids without alcohol. A detergent formulation containing 10% potassium pyrophosphate and 25% of the amphoteric phenolic surfactant showed a phenol coefficient at 20° C. against *Salmonella typhosa* of 15.6 using the A.O.A.C. method. A detergent formulation, containing 25% of the surfactant, 3% ethylenediamine tetraacetic acid sodium salt, with and without the addition of 2% trisodium phosphate was found comparable to a leading commercial cleaner when tested by the Gardner washability apparatus on soiled flooring panels.

The reaction product, diluted to 25% and acidified to bring the pH below 7, showed a phenol coefficient of 10 against *Salmonella typhosa*, the composition being cationic.

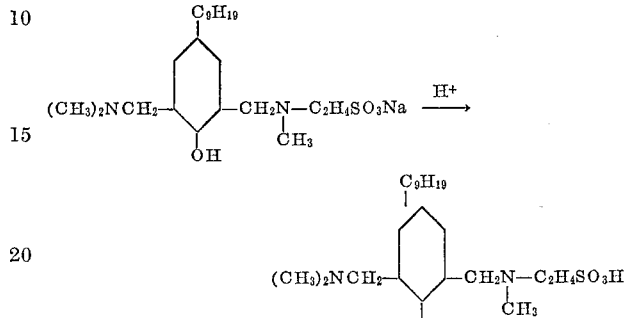

EXAMPLE 19

248 grams of 65% sodium N-methyl taurate (1 mole) 70 grams water, 66 grams isopropanol, 132 grams of 37% formaldehyde solution (1.64 moles) and 150 grams para tertiary butylphenol were mixed. Upon heating the phenol dissolved, the mixture cleared and the solution then refluxed for 3 hours. The following product which has excellent surface active properties was obtained:

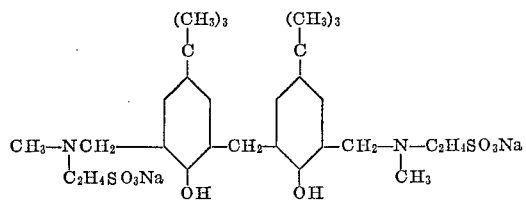

EXAMPLE 20

The product of Example 18 was prepared in a different manner. 1056 grams of 65% sodium N-methyl taurate, 880 grams nonylphenol (95% assay), 400 grams isopropanol, 314 grams water and 18 grams bisulfite were mixed together. With continuous agitation, 352 grams of 37% formaldehyde solution were added over a short period. Subsequently the temperature rose to 40° C. After 15 minutes the reaction mixture was heated over a period of 45 minutes to 70° C. and then cooled to 50° C. An additional 248 grams of 37% formaldehyde solution and 330 grams of 40% dimethyl amine solution were added. The solution was then heated under reflux for 1 hour. Subsequent distillation over a period of about 2 hours until the pot temperature was 98° C. and the product began to foam, yielded 583 grams of distillate containing water, alcohol and small amounts of unreacted formaldehyde and dimethyl amine. The distillate was replaced with water. The product, containing approximately 50% solids, light amber in color, was then cooled to room temperature. For the sake of brevity this product will be referred to as NPD.

Germicidal activity and unusual compatibilities with other germicides was found in many formulations. The composition containing—

| | Parts |
|---|---|
| NPD | 40 |
| Cocobenzyldimethyl ammonium chloride | 5 |
| Water, to make 100 parts. | | showed phenol coefficients of 17.5 and 15 against *Micrococcus pyogenes* var. *aureus* #209 and *S. typhosa* respectively using Letheen Broth, twice these values using the A.O.A.C. Nutrient Broth. A detergent disinfectant formulation containing

| | Parts |
|---|---|
| NPD | 40 |
| Cocobenzyldimethyl ammonium chloride | 5 |
| Tetrapotassium pyrophosphate | 5 |
| Ethylene diamine tetraacetic acid | 1.5 |
| Potassium hydroxide | 1 |
| Water, to make 150 parts. | | was tested against *M. pyogenes* var. *aureus* at a dilution of 1:60 using the A.O.A.C. Use-Dilution Method with Letheen Broth. All 10 subcultures and resubcultures were negative for bacterial growth.

The Hoffman, Yeager, Kaye Test for Self-Disinfecting Surface (Antiseptics, Disinfectants, Fungicides and Chemical and Physical Sterilization, edited by George F. Reddish, pages 134–6) also indicates the germicidal character of NPD and other products of this invention.

The formulation containing—

| | Parts |
|---|---|
| NPD | 50 |
| Tetrapotassium pyrophosphate | 5 |
| Potassium hydroxide | 1 |
| Ethylene diamine tetraacetic acid | 1.5 |
| Water, to make 100 parts. | | at a dilution of 1:112.5 in water of 100 parts per million hardness was applied to enameled and vinyl tile surfaces. Tested at 98% relative humidity against *M. pyogenes* var. *aureus* and *E. coli* there was 0% recovery as compared to 100% recovery of the control in replicate tests with milk and broth. Similarly the formulation containing—

| | | | |
|---|---|---|---|
| NPD | 40 parts | 40 parts | 50 parts. |
| Cocobenzyl dimethyl ammonium chloride. | 5 parts | | |
| O-benzyl-p-chlorophenol | | 5 parts | |
| Isopropanol | | 10 parts | |
| Tin-San * | | | 0.25 parts. |
| Tetrapotassium pyrophosphate | 5 parts | 5 parts | 5 parts. |
| Potassium hydroxide | 1 part | 1 part | 1 part. |
| Ethylene diamine tetraacetic acid | 1.5 parts | 1.5 parts | 1.5 parts. |
| Water, to make | 150 parts | 100 parts | 100 parts. |
| and diluted | 1:200 | 1:300 | 1:300. |
| also gave complete bacterial inhibition. | | | |

*An organo-tin germicide (Stecker Chemicals, Inc., Ridgewood, N.J.)

Additional formulations containing—

| | Parts |
|---|---|
| NPD | 28.5 |
| Cocobenzyl dimethyl ammonium chloride | 0.75 |
| Tetrapotassium pyrophosphate | 5–8 |
| 38% tetrasodium ethylene diaminetetraacetate | 8 |
| Pine oil | 0–2 |
| 85% phosphoric acid, to reduce pH from 10.6 to desired value | 0–1.2 |
| Sodium bisulfite or sulfite, as antioxidant | 0–1.5 |
| Water, to make 150 parts. | |

Tested at a dilution of 1:100 over the pH of 9.4–10.6 as above gave 100% kill.

Similarly the product containing only 5 parts of pyrophosphate 1:100, in 800 p.p.m. hard water gave the same results. Other surfaces tested included rubber tile, asphalt tile, stainless steel, terrazo and ceramic tile in replicate tests with milk and broth against both *M. pyogenes* var. *aureus* and *S. choleraesuis*, all showing complete inhibition of bacterial growth.

A formula compounded with Ultrawet 35KX, a liquid anionic alkyl aryl sulfonate detergent (Atlantic Refining Co.) containing—

| | Parts |
|---|---|
| NPD | 9.1 |
| Cocobenzyl dimethyl ammonium chloride | 0.4 |
| Ultrawet 35KX | 17 |
| 40% solution sodium xylene sulfonate, as clarifying agent | 10 |
| Tetrapotassium pyrophosphate | 5 |
| 38% tetrasodium ethylene diamine tetra acetate solution | 5 |
| Phosphoric acid, to pH 9.5 | 0.75 |
| Water, to make 100 parts | | was tested at a dilution of 1:100 on vinyl tile against *M. pyogenes* var. *aureus* and *S. choleraesuis*. In replicate tests with milk and broth there was complete inhibition of *M. pyogenes* var. *aureus*, 5% recovery of *S. choleraesuis* in milk and none in the broth.

In addition to NPD, other products of this invention which have surface active and detergent properites, were also found to be strongly germicidal on the basis of the Hoffman, Yeager, Kaye test on surfaces. These include the reaction products of Examples 6, 11, 12; products obtained by the reaction of sodium N-methyl taurate and formaldehyde with either ortho- or para-amyl phenols, Bisphenol A, products obtained from the reaction of sodium N-methyl taurate and resorcinol with either butylaldehyde and valeraldehyde and their isomeric aldehydes.

Those skilled in the art will recognize that many different types of products can be prepared within the scope of this invention and that they may be either concentrated or dried or mixed with other materials to obtain dry powder or paste types of products useful as germicides, detergents or bacteriostats. Other types of germicides may be incorporated depending upon specific requirements as well as salts and alkalies.

The results of germicidal tests on hard surfaces, floors, walls, tiles, etc. using the Hoffman, Yeager, Kaye technique of evaluation with suitable controls indicate that the combination of NPD with other types of germicides, phenolic quaternary ammonium and organo-metallic is at least additive. This is corroborated by the greater dilution at which these combinations are germicidal. NPD also protects quaternary type germicides against inactivation by anionic surface active agents as indicated in the preceding composition. It is therefore possible to formulate anionic detergents containing small amounts of quaternary ammonium germicides together with NPD for detergent-sanitizing applications.

In the foregoing specification certain terms have been used which have generally accepted meanings, but it is useful to recapitulate that meaning in this context. Amphoteric describes a chemical compound including in its structure both acid and base-forming groups, such as —COOM—, —SO$_3$M, —PO$_3$M, as acid groups, and R$_1$R$_2$NH, R$_1$R$_2$R$_3$N, as basic groups, so that in alkali solution there is an anionic substance and in acid solution a cationic substance. Oligodynamic as applied to metal compounds means the compound has a level of germicidal activity unusually high for the amount of metal made available by the compound.

A non-aromatic amino acid is meant to refer to the type of compound in which the N is not connected to an aromatic nucleus. In such context an aryl alkyl amino acid, e.g.,

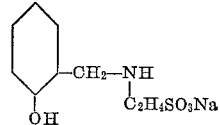

is not an aromatic amino acid.

What is claimed is:
1. A compound having the formula:

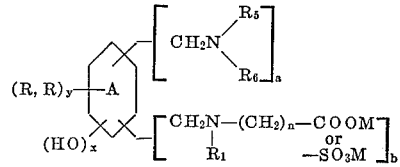

wherein:

b has integral values in the range 1, 2 and
a has integral values in the range 1, 2;
the ring labeled A represents phenyl or naphthyl;
R is a hydrogen and alkyl hydrocarbyl substituent which may contain up to 12 carbon atoms and one R may be $NO_2$ or Cl;
y is an integer having a value in the range 1–2;
x is an integer having a value in the range 1–2;
$R_1$ is selected from the group consisting of alkyl moieties having fewer than 10 carbon atoms;
n is an integer having a value in the range 1–6;
M is hydrogen or alkali metals, ammonium, amine groups, or methyl, ethyl, propyl or butyl ester groups.
$R_5$ and $R_6$ are independently, hydrogen or low molecular weight alkyl and cyclo alkyl groups of a total of 8 carbon atoms, and may be bridged to form a cycloaliphatic amino.

2. A product in accordance with claim 1 wherein the amino acid substituent on the phenyl nucleus is a sarcosine moiety.

3. A compound in accordance with claim 1 having the following formula:

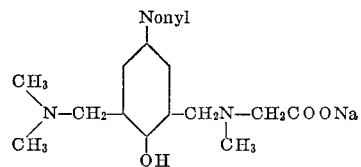

4. A compound in accordance with claim 1 having the following formula:

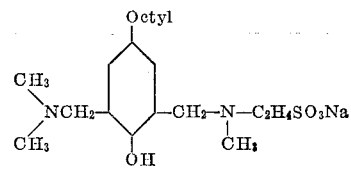

References Cited

UNITED STATES PATENTS 2,763,680  9/1956  Sallmann _____ 260—507
3,230,249  1/1966  Gaertner _____ 260—509

FLOYD D. HIGEL, *Primary Examiner.*